United States Patent [19]

Moergeli

[11] 3,839,332

[45] Oct. 1, 1974

[54] PROCESS FOR THE MANUFACTURE OF ANTHRAQUINONE DYESTUFFS

[75] Inventor: Eduard Moergeli, Muttenz, Switzerland

[73] Assignee: Ciba-Geigy AG, Basle, Switzerland

[22] Filed: Aug. 18, 1971

[21] Appl. No.: 172,916

Related U.S. Application Data

[63] Continuation-in-part of Ser. No. 752,147, Sept. 13, 1969, abandoned.

[52] U.S. Cl. ............... 260/249, 260/256.4, 8/54.2
[51] Int. Cl. ................ C07d 55/20, C07d 51/48
[58] Field of Search ................ 260/249, 256.4

[56] References Cited
UNITED STATES PATENTS

| | | | |
|---|---|---|---|
| 2,040,396 | 5/1936 | Morrell et al. | 260/585 X |
| 2,490,813 | 12/1949 | Hughes et al. | 260/581 X |

OTHER PUBLICATIONS
Sabatier, "Catalysis in Organic Chemistry," D. Van Nostrand Co., (New York) 1922, p. 324 QD501.53cE Primary Examiner—John M. Ford

[57] ABSTRACT

Process for the manufacture of anthraquinone dyestuffs of the formulae $(A-NH)_n-B_1$ or $A-(NHB_2)_m$ in which A is unsubstituted anthraquinonyl or anthraquinonyl substituted by acylamino-, methoxy or acetyl groups, $B_1$ is a radical of the formulae

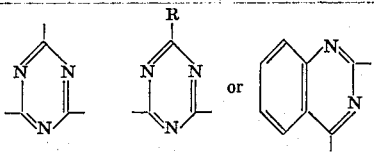

in which R is phenyl or lower alkyl, $B_2$ is lower alkanoyl, benzoyl-, or thiobenzoyl, $n$ is the number 2 or 3 and $m$ the number 1 or 2, which comprises condensing in the presence of an acid binding agent and an addition compound of copper-I-iodide and a pyridine base as catalyst a chloro- or bromoanthraquinone having as optional substituents in the anthraquinone radical benzoylamino-, methoxy or acetyl groups, with the amides of benzoic acid, thiobenzoic acid, or with melamine, 2-lower alkyl or 2-phenyl-2,6-diamino-1,3,5-triazine or 2,4-diamino quinazoline.

8 Claims, No Drawings

PROCESS FOR THE MANUFACTURE OF ANTHRAQUINONE DYESTUFFS

The present application is a continuation-in-part of Ser. No. 752,147, filed Sept. 13, 1968, and now abandoned.

The present invention provides a process for the manufacture of anthraquinone dyestuffs of the formulae

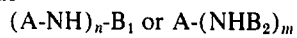

in which A is unsubstituted anthraquinonyl or anthraquinonyl substituted by acylamino-, methoxy or acetyl groups, $B_1$ is a radical of the formulae

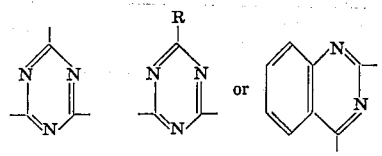

in which R is phenyl or lower alkyl, $B_2$ is lower alkanoyl, benzoyl-, or thiobenzoyl, n is the number 2 or 3 and m the number 1 or 2, which comprises condensing in the presence of an acid binding agent and an addition compound of cooper-I-iodide and a pyridine base as catalyst a chloro- or bromoanthraquinone having as optional substituents in the anthraquinone radical benzoylamino-, methoxy or acetyl groups, with the amides of benzoic acid, thiobenzoic acid, or with melamine, 2-lower alkyl or 2-phenyl-2,6-diamino-1,3,5-triazine or 2,4-diamino quinazoline.

As chloro- or bromoanthraquinones to be used according to the process, there may especially be mentioned for example, 1-chloranthraquinone, 1,5-dichloranthraquinone, 1,8-dichloranthraquinone, 1-bromanthraquinone, 1,5-dibromanthraquinone, 1,8-dibromanthraquinone, 2-chloranthraquinone, 2,6-dichloranthraquinone, 2,7-dichloranthraquinone, 2-bromanthraquinone, 2,6-dibromanthraquinone, 2,7-dibromanthraquinone, 1-chloro 5-acetylaminoanthraquinone 1-chloro-4-benzoylaminoanthraquinone, 1-bromo-4-benzoylaminoanthraquinone, 1-chloro-5-benzoylaminoathraquinone, 1-bromo-5-benzoylaminoanthraquinone, 1-chloro-2-methylanthraquinone, 1-chloro-4-methylanthraquinone, 1-chloro-4-methoxyanthraquinone, 1-bromo-2-methoxyanthraquinone, 1-bromo-4-methoxyanthraquinone, Bz-1-chlorobenzanthrone, Bz-1-bromobenzanthrone, 6-Bz-1-dichlorobenzathrone, 6-Bz-1-dibromobenzanthrone, dichloranthanthrone, dibroamthanthrone, dibromobenzpyrenequinone or tribromopyranthrone.

As examples of carboxylic acid amides there may be mentioned: acetamide, N-methylacetamide, propionic acid amide, butyric acid amide, succinimide, glutarimide, benzoic acid amide, thiobenzamide, N-methylbenzoic acid amide, terephthalic acid diamide, isophtalic acid diamide, phthalimide, nicotinic acid amide, furane-2-carboxylic acid amide or thiophene-2-carboxylic acid, amino-triazines and amino-diazines there may be mentioned 1,3,5-triaminotriazine (melamine), 2-methyl-4,6-diaminotriazine (acetoguanamine), 2-phenyl-4,6-diaminotriazine (benzoguanamine), 2-(2'-hydroxynaphthyl-1')-4,6-diaminotriazine, 2,4-diaminopyrimidine, 2,4,5-triaminopyrimidine, 2,4-diaminoquinazoline, 2,3-diaminoquinoxaline.

The condensation is effected in the presence of one of the usual acid-binding agents, for example, an alkali salt of a weak acid, for example, sodium acetate, sodium carbonate or potassium carbonate.

The addition compounds of copper-I iodide with pyridine bases to be used according to the invention are known compounds. The term pyridine bases, includes pyridine and related compounds, for example, the picolines, lutidines, collidines, quinoline, isoquinoline and α, α'-dipyridyls. These addition compounds are easely formed by dissolving the cuprous iodide in the pyridine base, the latter being advantageously used in excess. It is probable that the complexes contain cuprous iodide and pyridine in the ratio of 1:2. In contrast to cuprous iodide they are easily soluble in organic solvents and can therefore easily be separated from the condensation products obtained. These addition compounds are obtained in a particularly simple manner if finely divided copper is heated with the equivalent quantity of iodine and the pyridine in an inert organic solvent.

According to "Gmelins Handbuch der anorganischen Chemie" (Gmelins Handbock of Inorganic Chemistry), Copper, Part B, Issue 1, Page 411, the addition compounds of cuprous iodide are unstable and decompose into the components at an elevated temperature. It is all the more surprising that they prove sufficiently stable towards the conditions of the process according to the invention.

The quantity ratio between the reagents and the catalyst can vary within wide limits. In general it is advantageous to use at least 0.02, preferably 0.1 to 0.5, mol of the catalyst per replaceable halogen atom. The use of larger quantities of catalyst does not produce any advantages and is therefore uneconomical.

The reaction preferably takes place in a high-boiling inert organic solvent, for example, nitrobenzene or especially o-dichlorobenzene, at elevated temperature, for example at a temperature within the range of from 120° to 250°C.

The reaction is generally complete in a few hours. The advantage of the process according to the invention as against the process which is for example described in German Patent Specification 889,496 and U.S. Pat. No. 2,346,726, which use cuprous iodide or cuprous bromide as catalysts, manifests itself in higher yields, a lower requirement of cuprous iodide, a shorter reaction time, a lower reaction temperature and a greater purity of the end products.

The following Examples illustrate the invention. The parts, unless otherwise stated, denote parts by weight and the percentages denote percentages by weight.

EXAMPLE 1

A mixture of 11.25 parts of 2-phenyl-4,6-diamino-1,3,5-triazine, 30.6 parts of 1-chloranthraquinone, 15.9 parts of soda and 200 parts of nitrobenzene is mixed with a solution of 1.65 parts of cuprous iodide in 9 parts of pyridine and is then stirred for 12 hours at 150° to 155°C under reflux. The reaction product is filtered off at 100°C, washed with nitrobenzene warmed to 100°C until the filtrate only remains slightly coloured, then washed with alcohol and finally washed with water until free of alkali.

After drying 34.7 parts, corresponding to a yield of 96.7 percent of theory, of pure 2-phenyl-4,6-di- (anthraquinonylamino-1')-1,3,5-triazine, which may, without further purification, be used as pigment, are obtained.

If the condensation is carried out with 1.65 parts of cuprous iodide but without pyridine, only 11 parts of the dyestuff are produced, corresponding to a yield of 30.6 percent of the theoretical value.

EXAMPLE 2

A mixture of 8.3 parts of 1,5-dichloroanthraquinone, 7.6 parts of benzamide, 8 parts of sodium carbonate and 105 parts of o-dichlorobenzene is mixed with a warm solution of 0.82 part of cuprous iodide in 4 parts of quinoline and is then stirred for 6 hours under reflux at 170° to 175°C. The reaction product is filtered off at 120°C, washed with o-di-chlorobenzene warmed to 100°C until the filtrate only remains light yellow in colour, then washed with alcohol and finally washed with water until free of alkali.

After drying 10.7 parts, corresponding to a yield of 79.9 percent of the theoretical amount, of pure 1,5-di-(benzoylamino)-anthraquinone are obtained.

If the process of the example is again carried out with 0.82 part of cuprous iodide but without quinoline, only 1 part of 1,5-di-(benzoylamino)-anthraquinone is produced, corresponding to a yield of 7.5 percent of the theoretical value. With the same success 1,5-dichloranthraquinone can be reacted with acetamide or butyric acid amide according to the method described in the first paragraph to form 1,5-diacetylaminoanthraquinone or 1,5-dibutyrylaminoanthraquinone, respectively.

Example 3

A solution of 1.9 parts of cuprous iodide in 11 parts of pyridine is added to a mixture of 22.3 parts of 2-aminoanthraquinone, 36.1 parts of 1-chloro-4-benzoylaminoanthraquinone, 21.2 parts of sodium carbonate and 640 parts of o-dichlorobenzene. The mixture is stirred for 24 hours at 150° to 155°C in a vessel provided with a reflux condenser and the reaction product is filtered off at 100°C, washed with o-dichlorobenzene until the filtrate is light-coloured and then worked up in the usual manner.

41.5 parts of pure 4-benzoylamino-1,1'-anthrimide are obtained, corresponding to a yield of 75.8 percent of theory.

The same product is obtained in a pure yield of only 65 percent of the theoretical amount according to Example 6 of German Patent Specification No. 889,496.

Example 4

A mixture of 13.4 parts of 2-amino-anthraquinone, 15.2 parts of 2-chloranthraquinone, 8 parts of sodium carbonate, 3.2 parts of cuprous iodide and 54 parts of quinoline is stirred for 45 hours at 205°C. 60 parts of nitrobenzene are added and the mixture stirred for a further hour at 200°C and the product filtered off at 130°C. The residue is washed with nitrobenzene, then with alcohol and water and finally thoroughly with acetone, whereupon the hitherto very difficult to obtain 2,2'-anthrimide remains in a pure form as copper-red crystals.

Example 5

A mixture containing 2.5 parts of acetoguanamine, 17 parts of 1-benzoylamino-4-bromanthraquinone, 5.3 parts of sodium carbonate and 43 parts of o-dichlorobenzene is mixed with a warm solution of 0.55 part of cuprous iodide in one part of pyridine and is then stirred for 4 hours under reflux at 170 to 175°C. The reaction mixture is diluted with 43 parts of o-dichlorobenzene, briefly stirred at 170°C and the product filtered off at 70°C. The residue is washed with o-dichlorobenzene until the filtrate remains only slightly coloured and is worked up in the usual manner. 10.6 parts, corresponding to a yield of 68.4 percent of the theoretical amount, of pure 2-methyl-4,6-di-(4'-benzoylamino-anthraquinonyl-1') -1,3,5- triazine are obtained.

If the present example is carried out without addition of pyridine, otherwise proceeding in the same way, only 8.5 parts of the condensation product are produced, corresponding to 54.8 percent of the theoretical amount.

If in the present example the pyridine is replaced by the same quantity of isoquinoline, 9.9 parts, corresponding to 63.8 percent of the theoretical value, of condensation product are obtained.

If instead of the 1-benzoylamino-4-bromanthraquinone the 1-benzoylamino-4-chloranthraquinone is used, the yields obtained bear a similar relationship.

Example 6

A mixture of 1.87 parts of 2-phenyl-4,6-diamino-1,3,5-triazine, 5.99 parts of 1-amino-2-acetyl-4-chloranthraquinone of melting point 227°C, corrected (obtainable by chlorination of 1-amino-2-acetyl-anthraquinone with sulphuryl chloride in o-dichlorobenzene), 2.65 parts of sodium carbonate, and a solution of 0.64 part of cuprous iodide in 3 parts of α-picoline and 42 parts of nitrobenzene is stirred for 5 hours at 160° to 165°C. The dyestuff which is produced in uniform dark blue crystals is filtered off at 80°C, washed with nitrobenzene, alcohol and water and boiled with 5 percent strength nitric acid. After drying, 3.8 parts of a dyestuff are obtained which dyes cotton from a brownish-olive vat to give blue shades of outstanding light-fastness.

If the condensation is carried out without picoline, only 0.6 part of the blue dyestuff are obtained.

Example 7

A mixture of 12.1 parts of 1-benzoylamino-4-bromanthraquinone, 10.2 parts of thiobenzamide, 8 parts of sodium carbonate, 78 parts of o-dichlorobenzene and a solution of 0.82 part of cuprous iodide in 3.7 parts of α-picoline is stirred for 6 hours at 150° to 155°C. The dyestuff which crystallises out in uniform red needles is filtered off at 100°C, washed with o-dichlorobenzene, alcohol and water and further boiled witz 5 percent strength nitric acid. 8.6 parts of a dyestuff of melting point above 330°C are obtained, which dyes cotton from a red vat to give fast red shades.

If the process is carried out in the absence of α-picoline, only 7.4 parts of the red dyestuff are obtained.

Example 8

A mixture of 2 parts of 2,4-diaminoquinazoline, 7.23 parts of 1-chloro-5-benzoylamino-anthraquinone, 5,3 parts of sodium carbonate, 78 parts of o- dichlorobenzene and a solution of 0.6 parts of cuprous iodide in 2.6 parts of α-picoline is stirred for 17 hours at 170° to 175°C. The dyestuff which is produced in uniform organge-coloured needles is filtered off at 100°C, washed with O-dichlorobenzene, alcohol and water and further boiled witz 5 percent strength nitric acid. After drying 5.8 parts, corresponding to a yield of 71.3 percent of the theoretical amount, of a dyestuff of probable formula

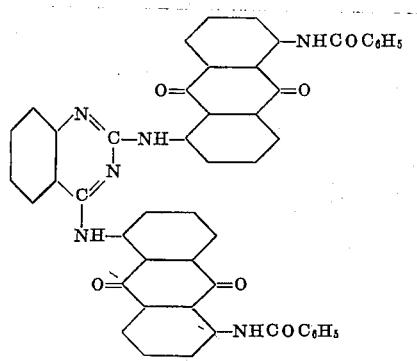

are obtained.

Against this, only 3.4 parts, corresponding to 41.7 percent of the theoretical amount, of the same dyestuff are obtained if the process is carried out without α-picoline.

Example 9

A mixture of 7.48 parts of benzoguanamine, 34.2 parts of 1-benzoylamino-4-bromanthraquinone, 10.6 parts of sodium carbonate, and a solution of 1.1 parts of cuprous iodide in 3.5 parts of α-picoline and 168 parts of nitrobenzene is stirred for 4 hours at 170° to 175°C. The dyestuff which is uniformly produced in red small needles is filtered off at 100°C, washed with warm nitrobenzene and then with alcohol and water, and further boiled with 5 percent strength nitric acid. After drying 31.5 parts, corresponding to 89.4 percent of the theoretical amount, of a red pigment of the following formula

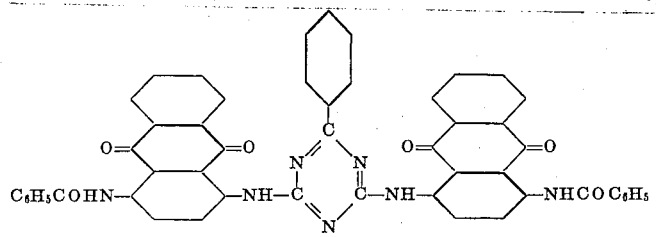

which is fast to migration are obtained.

Without the use of α-picoline a yield of only 27.2 parts is obtained, corresponding to 77.2 percent of the theoretical amount.

Example 10

A mixture of 12.1 parts of 1-benzoylamino-4-bromanthraquinone, 10.2 parts of 2-amino-benthiazole, 8 parts of sodium carbonate, and a solution of 0.82 part of cuprous iodide in 3.7 parts of α-picoline and 78 parts of o-dichlorobenzene is stirred for 6 hours at 150° to 155°C. The (4'-benzoylamino-anthraquinonyl-1')-2-amino-benthiazole produced in violet crystals is filtered off at 100°C and worked up. 9.1 parts thereof are obtained.

If no α-picoline is used, only 7.8 parts of the dyestuff are obtained.

Example 11

A mixture of 2.52 parts of melamine, 9.7 parts of 1-chloranthraquinone, 10.6 parts of sodium carbonate, and a solution of 1 part of cuprous iodide in 4 parts of α-picoline and 72 parts of nitrobenzene is stirred for 20 hours at 170° to 175°C. The deystuff which crystallises in orange-coloured small needles is filtered off at 100°C and worked up in the usual manner. 4.1 parts of dyestuff are obtained.

If the process is carried out without the addition of α-picoline only 0.8 part of the dyestuff are obtained.

Solutions of the cuprous iodide-pyridine catalyst in organic solvents may advantageously be obtained as follows:

A mixture of 7.05 parts of natural copper C and 12.7 parts of iodine in 100 parts of o-dichlorobenzene is stirred for 2½ hours at 170° to 175°C. The mixture is allowed to cool to 95°C and 34.1 parts of pyridine are added. After complete solution ot the cuprous iodide 100 parts of o-dichlorobenzene are added and the resulting solution is filtered at 90°C.

I claim:

1. A process for the manufacture of anthraquinone dyestuffs of the formulae $$(A-NH)_n-B_1 \text{ or } A-(NHB_2)_m$$

in which A is unsubstituted anthraquinonyl or anthraquinonyl substituted by benzoylamino, methoxy or acetyl groups, $B_1$ is a radical of the formulae

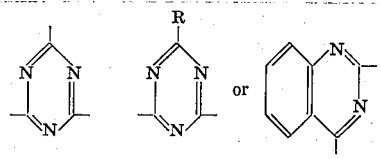

in which R is phenyl or lower alkyl, $B_2$ is lower alkanoyl, benzoyl-, or thiobenzoyl, n is the number 2 or 3 and m the number 1 or 2, which comprises condensing in the presence of an acid binding agent and 0.02 to 0.5 mol per replaceable halogen atom of an addition compound of copper-I-iodide and a pyridine base as catalyst a chloro-or bromoanthraquinone having as optional substituents in the anthraquinone radical benzoylamino, methoxy or acetyl groups, with the amides of the formula $B_2NH_2$ or with melamine, 2-lower alkyl or 2-phenyl-2,6-diamino-1,3,5-triazine or 2,4-diamino quinazoline.

2. A process as claimed in claim 1, wherein 1-chloroanthraquinone is used as starting material.

3. A process as claimed in claim 1, wherein 1-chloro- or 1-bromo-4-or-5-benzoylaminoanthraquinone is used as starting material.

4. A process as claimed in claim 1, wherein melamine is used as starting material.

5. A process as claimed in claim 1, wherein 2-lower-alkyl-4,6-diamino-1,3,5-triazine or 2-phenyl-4,6-diamino-1,3,5-triazine is used as starting material.

6. A process as claimed in claim 1, wherein the reaction is carried out in a high-boiling organic solvent.

7. A process as claimed in claim 1, wherein the reaction is carried out in o-dichlorobenzene.

8. A process as claimed in claim 1, wherein the reaction is carried out at a temperature within the range of from 120°–250°C.

* * * * *